Sept. 18, 1923.  A. F. WALLBILLICH  1,468,426
SPEED, TIME, AND DISTANCE RECORDER
Filed Nov. 23, 1921    3 Sheets-Sheet 1
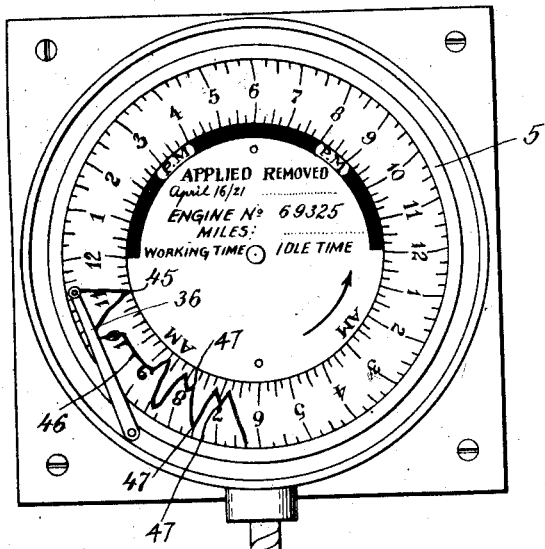
Fig.1,
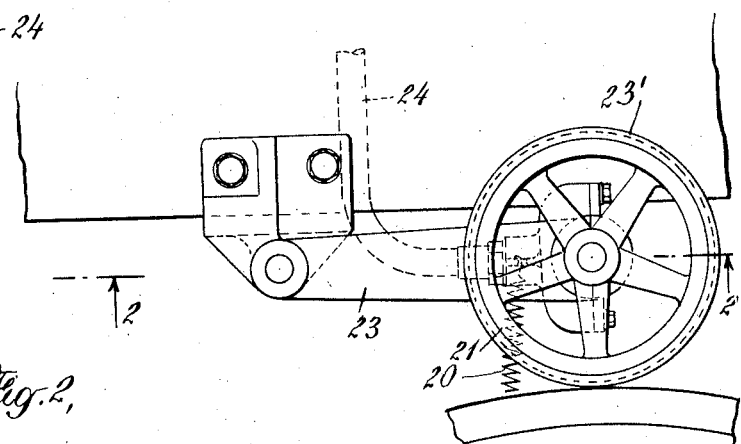
Fig.2,
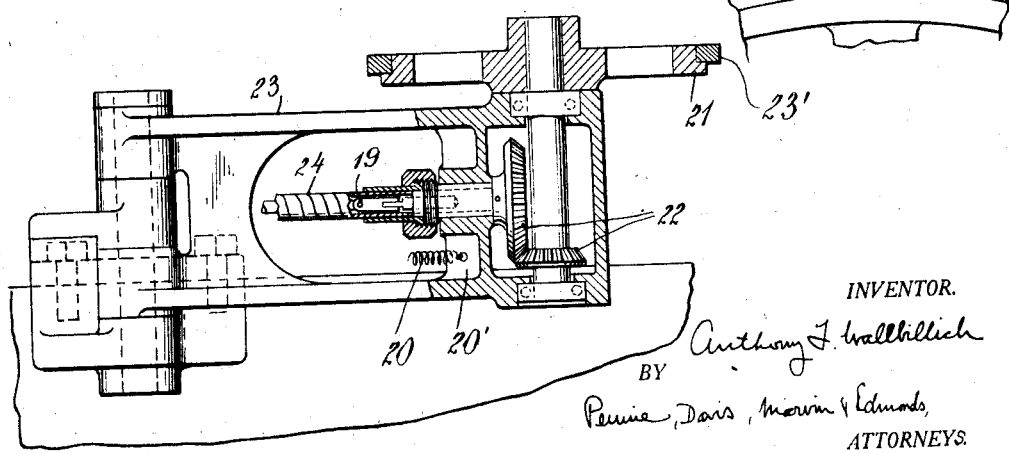
INVENTOR.
Anthony F. Wallbillich
BY
Pennie, Davis, Marvin & Edmonds,
ATTORNEYS.

Sept. 18, 1923.
A. F. WALLBILLICH
SPEED, TIME, AND DISTANCE RECORDER
Filed Nov. 23, 1921   3 Sheets-Sheet 2
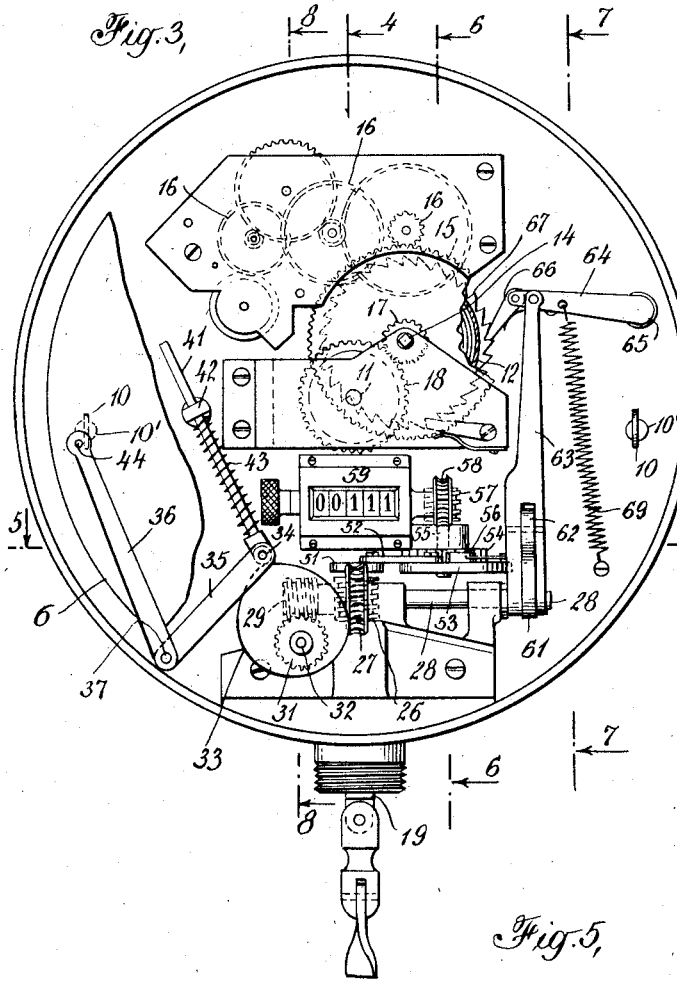
Fig. 3,
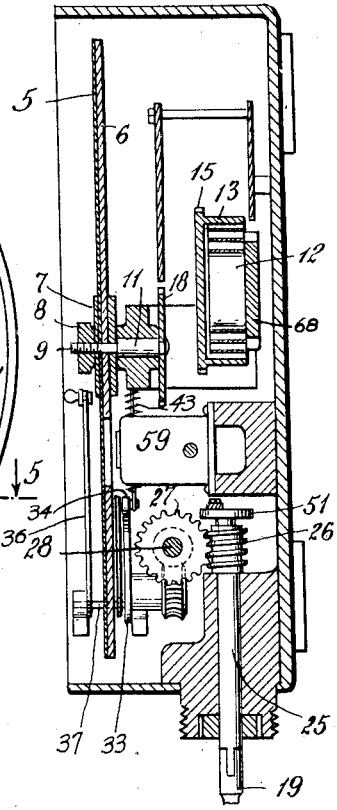
Fig. 4,
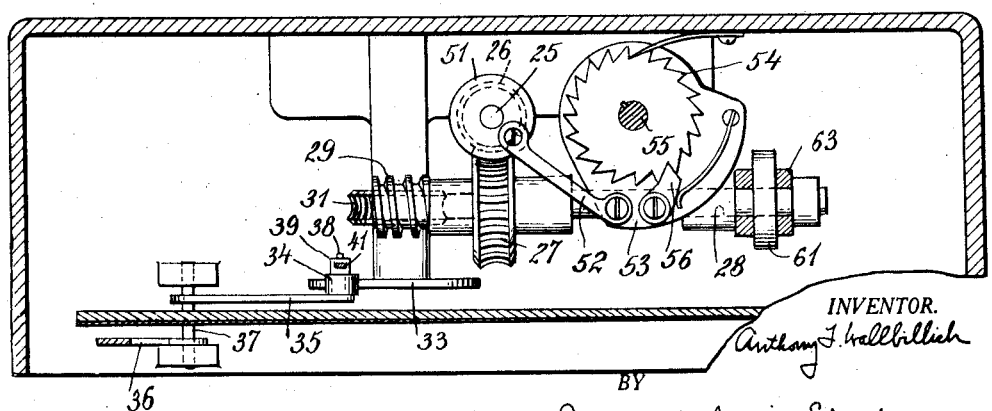
Fig. 5,
INVENTOR.
Anthony F. Wallbillich
BY
Pennie, Davis, Marvin & Edmonds,
ATTORNEYS.

Sept. 18, 1923.
A. F. WALLBILLICH
SPEED, TIME, AND DISTANCE RECORDER
Filed Nov. 23, 1921   3 Sheets-Sheet 3
1,468,426
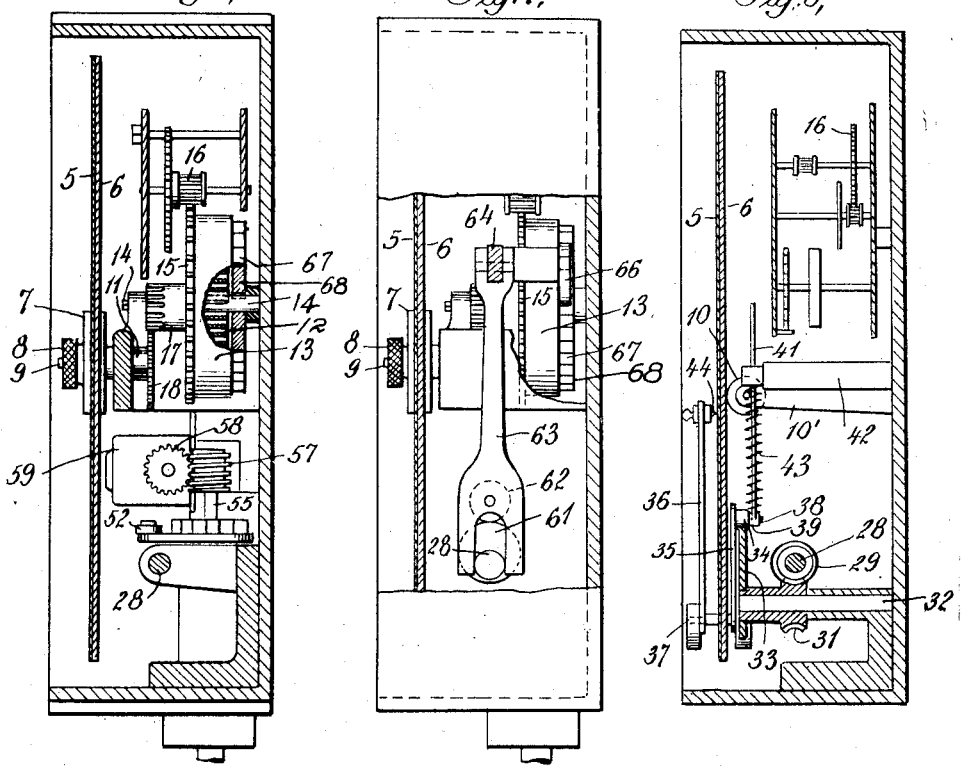
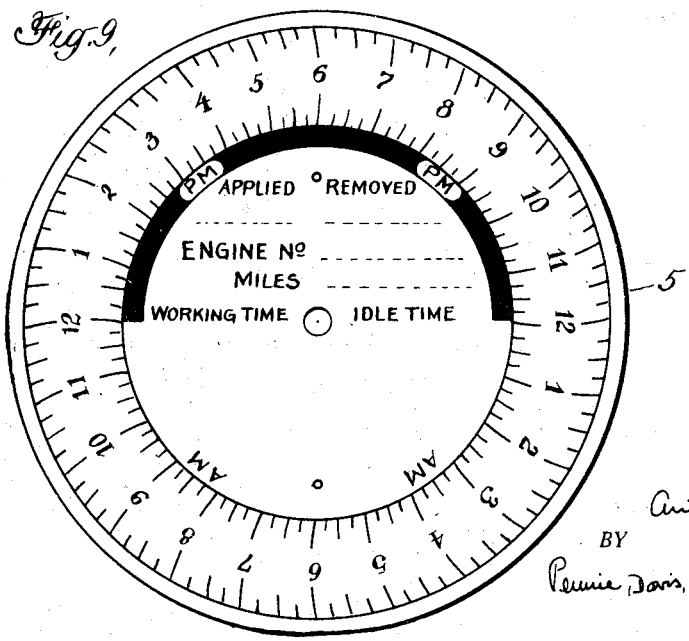
INVENTOR.
Anthony F. Wallbillich
BY
Pennie, Davis, Marvin & Edmonds
ATTORNEYS Patented Sept. 18, 1923.

1,468,426

UNITED STATES PATENT OFFICE.

ANTHONY F. WALLBILLICH, OF NEWARK, NEW JERSEY, ASSIGNOR TO S. T. D. RECORDING INSTRUMENT CORP., OF ROSELLE, NEW JERSEY, A CORPORATION OF NEW JERSEY.

SPEED, TIME, AND DISTANCE RECORDER.

Application filed November 23, 1921. Serial No. 517,175.

*To all whom it may concern:*

Be it known that I, ANTHONY F. WALLBILLICH, residing at Newark, in the county of Essex, State of New Jersey, have invented certain new and useful Improvements in Speed, Time, and Distance Recorders; and I do hereby declare the following to be a full, clear, and exact description of the invention, such as will enable others skilled in the art to which it appertains to make and use the same.

This invention is a device for recording the daily operation of a vehicle, such as a locomotive; it is designed to record the working time, the idle time, and the total distance traveled, whether that travel be forwardly or backwardly.

This record of the daily operation is made on a card or disc graduated for indicating the twenty four hours of the day. A separate record disc is used for each locomotive for each day; the disc is provided with spaces in which the number of the engine, the engineer, the date, and other facts may be entered. These discs may be readily filed away to form a card index, from which facts relating to the daily, weekly, monthly or yearly operation of the locomotive may be readily ascertained.

The record disc is continuously and uniformly driven in one direction by a clock work mechanism. A distance responsive marker, which moves back and forth over the record disc an amount proportional to the distance traveled by the vehicle either forwardly or backwardly, indicates on the disc whether the locomotive was active or inactive at any given time during the day and also indicates the duration of the periods of activity and inactivity.

The marker in question is connected to a wheel, by a flexible shaft drive, the wheel running on the rail or on the tire of one of the wheels of the locomotive, whereby the marker is moved an amount proportional to the distance traveled. The marker is so connected to the driving wheel that it reverses its direction of motion with each reversal of the travel of the locomotive, and so indicates movement in either direction.

The record disc is detachably and adjustably secured to a supporting or backing disc so that the marker may be caused to start its marking operation at the proper place on the record disc corresponding to the hour at which the record disc is put in place.

One of the valuable features of the invention is a self-winding device, which automatically rewinds the clock mechanism when it has run down a certain amount. This rewinding device derives its power from the same source as the recording marker, that is from the wheel that runs on the tire of the locomotive. The rewinding device includes a spring which is balanced against the driving spring of the clock mechanism in such a way that when the driving spring has run down a certain amount, the other spring will act to rewind the clock spring. This other spring is periodically tensioned from the mentioned source of power.

The recording instrument includes a counting device, preferably calibrated in miles, which is actuated from the flexible shaft that operates the device, a connection being provided between the shaft and the counting device so that the counter will be driven always in one direction whether the vehicle be traveling forwardly or backwardly and thus will indicate the total travel of the locomotive.

While the apparatus of the invention is not primarily designed as a speed indicator, it is apparent that the space between successive undulations of the curve produced by the marking device, and the slope of that curve, give a close approximation of the speed at which the vehicle is traveling at any given point.

Other advantageous features of construction and operation will be apparent from a consideration of the detailed structure of the apparatus, illustrated in the accompanying drawings, which illustrate a preferred embodiment. It should be understood that the invention is not limited to the precise constructional details there shown.

Referring now to these drawings:

Fig. 1 is a front view of the recording device showing also the driving wheel therefor;

Fig. 2 is a section on the line 2—2 of Fig. 1;

Fig. 3 is a front view of the interior mechanism of the device;

Fig. 4 is a vertical section on the line 4—4 of Fig. 3;

Fig. 5 is a horizontal section on an enlarged scale on the line 5—5 of Fig. 3;

Figs. 6, 7, and 8 are sectional views taken on the lines 6—6, 7—7, and 8—8 respectively of Fig. 3, and Fig. 9 is a view of the record disc provided with graduations.

The record disc used in connection with the recording apparatus of this invention, indicated at 5 in Fig. 9, is a circular piece of paper or card board, provided with graduations around the outer part thereof for indicating the twenty-four hours of the day, and is printed so that the A. M. hours are readily distinguishable from the P. M. hours. Suitable blanks are provided in the middle of the disc in which are entered data for indicating the engine number, the date, the total working time, the total idle time, the daily mileage, etc. This record disc 5 is adjustably and detachably mounted on a rotatable backing disc 6, by means of a washer 7 and nut 8, the latter working on a threaded stud 9. A pair of rollers 10 rotatably mounted in the ends of studs 10' support the back of the disc so that it will run true and maintain its proper plane of rotation.

The disc 6 is mounted on a shaft 11 and is continuously and uniformly driven in one direction by clockwork. This clock work comprises a driving spring 12 enclosed in a spring drum 13, the inner end of the spring being fastened to the stud 14 passing through the center of the drum and the outer end of the spring being fastened to the drum, as is usual with mechanism of this nature. The stud 14 may have a squared end by which the spring may be wound up by a key in the usual way. The outer edge of the drum 13 is provided with gear teeth 15, with which engages the first of a series of clockwork escapement wheels 16 of usual construction. Projecting from one side of the drum 13 is a stud 17 provided with gear teeth that mesh with the gear wheel 18 on the shaft 11, whereby it will be apparent that the disc 6 will be driven continuously in one direction by the clockwork, here counterclockwise.

The apparatus is operated from the wheel 21, being connected to the wheel by the flexible shaft 19. This shaft is driven from the wheel through the gears 22. The wheel is provided with a hardened rim 23', shrunk on, and is carried on a bracket 23, the bracket being pivoted to the frame of the locomotive so that gravity holds the wheel on the tire of one of the locomotive wheels or on the rail, preferably the former. A spring 20, engageable at one end with the web 20' and fixed at the other end to a part of the locomotive frame, may also be used for holding the wheel 21 against the locomotive wheel.

The flexible shaft is, of course, encased in a flexible sheath 24; it is connected at its upper end to a vertical shaft 25 extending into the body of the instrument. A worm 26 carried on the shaft 25 drives a worm wheel 27 and thus rotates the shaft 28, on which the worm 27 is mounted. On the other end of the shaft 28 is carried a worm 29 which, through the worm wheel 31 drives a shaft 32 on which is mounted a heart shaped cam 33. This cam engages with a roller 34 mounted in one end of the arm 35 of a bell crank lever, the other arm of which is indicated at 36. Both arms of the lever are mounted on and movable with the pin 37. The arms of the lever may be relatively adjustable, but once the instrument is calibrated and the arms adjusted, their relative angle is not changed. The arm 35 of the bell crank lever carries a pin 38, on which the roller 34 is mounted; on this pin is mounted a sleeve 39 which is connected to or integral with a rod 41 which passes loosely through a hole in the end of a supporting bracket 42. A compression spring 43 is mounted, as shown, for pressing the arm 35 and roller 34 into continuous engagement with the cam 33.

The outer end of the arm 36 is provided with a marking stylus 44, which is, of course, made removable so that it may be readily renewed. This marking stylus is adapted to engage continuously against the recording surface of the disc 5 with sufficient force so that any movements of the stylus are clearly recorded on the record disc.

From the mechanism just described it will be apparent that the marking stylus will move back and forth over the record disc an amount proportional to the distance of travel of the vehicle and in so doing will trace a wavy line, as indicated at 45, when the locomotive is in motion. The instrument is preferably calibrated so that each complete oscillation of the marker indicates one mile of travel. The line traced by the marker thus indicates graphically the working time, the idle time, and the distance traveled. When the locomotive is idle a line concentric with the edge of the disc, as indicated at 46, will be traced. When the curve traced by the recording stylus reverses its direction at an intermediate point such as indicated at 47, it shows that the locomotive reversed its direction of travel at that point.

The mechanism for indicating numerically the total distance traveled forwardly and backwardly will now be described. There is mounted on the top of the shaft 25 a disc 51, to which is pivoted a crank 52, the other end of which is pivoted to a plate 53 which works loosely on a shaft 55 on which is firmly fastened a ratchet wheel 54. A spring pressed pawl 56 is mounted on the plate 53 and engages with the teeth of the ratchet wheel. It is apparent from the mechanism just described that if the shaft 25 is rotated in either direction when the locomotive travels forwardly or backwardly, the crank 52 will cause the plate 53 to oscillate and so continuously drive the shaft 55 in one direction, even though the locomotive should reverse its direction. There will, of course, be a small amount of lost motion for each reversal, which is negligible. The shaft 55, through a worm 57 mounted thereon, drives the worm wheel 58 which operates a revolution counter 59, which is preferably calibrated to read in miles.

The mechanism for automatically rewinding the clockwork spring will now be described. On the right hand end of the shaft 28 is mounted a cam 61 which engages against a roller 62 carried near the lower end of an arm 63, the lower end of which is bifurcated and engages over the shaft 28. The upper end of the arm 63 is pivoted to an arm 64 which in turn is pivoted to the casing at 65. A pawl 66 is carried on the outer end of the arm 64 and engages with ratchet teeth 67 cut in the edge of a disc 68, fixed on the shaft 14 to which is attached the inner end of the main spring 12, as has been described. A spring 69 is connected to the arm 64 at one end, and to the casing at the other.

The mechanism just described operates as follows: As the shaft 28 is continuously driven in one direction or the other, the arm 63 is lifted once for each revolution of the shaft, thus tensioning the spring 69. If now the main spring of the clock has run down a certain amount, the spring 69 comes into play to pull that arm down which, through the pawl 66, advances the disc 68 and the shaft 14 one tooth and therefore winds up the spring 12 a small amount. This operation is repeated until the spring 12 is wound up so strongly that the spring 69 can no longer overcome the strength of the spring 12, whereupon the arm 64 simply remains in the raised position, until the spring 12 runs down, whereupon the rewinding operation is repeated. It is evident that this mechanism is entirely automatic in its action.

To briefly summarize the operation of the device: The marking stylus moves back and forth over the record disc an amount proportional to the travel of the vehicle, thus giving a permanent record of the idle time and working time of the locomotive. The total distance traveled by the locomotive is indicated by the revolution counter to an amount indicating total mileage covered in both directions. The recording disc is continuously driven by the clockwork, preferably one complete revolution in twenty-four hours. The clockwork is automatically rewound and requires no attention on this account. At the end of a twenty-four hour period the completed record for the past twenty-four hours is removed and a fresh card put in place, this fresh card being moved to the proper position under the stylus corresponding to that particular hour, it being fastened in that position by the clamping elements 7 and 8.

I claim as my invention:—

1. A recording device for use on a vehicle, comprising a shaft rotatable in unison with the vehicle, a pair of relatively adjustable arms, a marker on one of said arms, means acting on the second arm to rock said arms, a guided rod mounted on the second arm and movable in unison therewith, a spring opposing the movement of said rod, and a continuously driven record disc to receive a record produced by said marker.

2. A recording device for use on a vehicle, comprising a shaft rotatable in unison with the vehicle, a bell crank adapted to be rocked by said shaft, a marker mounted on one arm of said bell crank, a recording disc to receive a record produced by said marker, spring driving means to give said record a continuous movement and means driven from said shaft to maintain the tension of said spring, said last named means being operable only when said tension has fallen below a predetermined value.

3. A recording device for use on a vehicle, comprising a shaft, a bell crank having a marker on one of the arms thereof, a cam driven by said shaft to rock said bell crank, a record disc, spring driving means to move said disc and means actuated from said shaft to maintain the tension of said spring, said last named means being operable only when said tension has fallen below a predetermined valve.

4. A recording device for use on a vehicle, comprising a record disk, means for continuously rotating the disk, a distance responsive marker for producing a graphic record of idle time and the working time of the vehicle, and means for giving a numerical total of the mileage covered in both forward and backward travel.

5. A recording device for use on a vehicle, comprising a record disk, means for continuously rotating the disk, a marker, means for moving the marker back and forth on the disk proportional to the distance traveled by the vehicle, both forwardly and backwardly, and means for indicating the total distance, forward and backward, covered by the vehicle.

6. A recording device for use on a vehicle, comprising a shaft, means to drive said shaft in unison with a vehicle, a marker adapted to be rocked as said shaft is rotated, a record disc adapted to receive a record produced by the movement of said marker, driving means for said disc including a spring driven drum and means driven by said shaft to maintain the tension of the spring within said drum, said last named means being operable only when said tension has fallen below a predetermined value.

7. A recording device for use on a vehicle, comprising a record disc, mechanism for continuously rotating said disk, a distance responsive marker, means for actuating the marker so that it reverses its direction of movement each time the vehicle reverses its direction of travel, and means for indicating the total forward and backward travel of the vehicle.

8. A recording device for use on a vehicle, comprising a shaft adapted to be driven in unison with the vehicle, a marker reciprocable by the rotation of said shaft, a record disc to receive a record produced by the movement of said marker, driving means for said disc including a tensioned spring, a drum encircling said spring having ratchet teeth on the periphery thereof, and a spring-held pawl to cause a partial rotation of said drum when the tension of the spring therein has fallen below the predetermined value.

9. A recording device for use on a vehicle, comprising a shaft, means to rotate said shaft in unison with said vehicle, a bell crank having a marker on one arm thereof and adapted to be rocked as said shaft is rotated, a record disc disposed to receive a record produced by said marker, spring-actuated driving means for said disc including a spring drum and a tensioned spring therein, a lever movable in one direction by the rotation of said shaft and having a portion engaging said drum and resilient means opposing the movement of said lever by said shaft, said means being so proportioned to said tension spring as to cause the partial rewinding of said spring when the tension falls below a predetermined value.

10. A recording device for use on a vehicle, comprising a shaft, means to drive said shaft in unison with the vehicle, a marker reciprocable by the rotation of said shaft, a record disc disposed to receive a record produced by said marker, driving means for said disc including a shaft, a spring drum, a spring within said drum tending to cause the rotation of said shaft and means to move said drum to cause the rewinding of said spring when the tension of the latter falls below a predetermined value, said last named means including a lever having a portion engaging said drum, a second lever adapted to be rocked from said first named shaft to cause the movement of said lever in one direction and a spring acting upon said lever to produce a return movement thereof, said last named spring exerting a restoring force less in value than the strength of said first named spring when the latter is fully wound.

11. A recording device for use on a vehicle comprising a record surface, spring driven mechanism for continuously moving said record surface, a spring-actuated device operable to automatically rewind the driving spring of the said mechanism when the tension of said spring has fallen below a predetermined value, and means for connecting said spring actuated device to a source of power actuated upon movement of the vehicle.

12. A recording device for use on a vehicle comprising a record surface, clockwork for continuously moving said surface, a spring actuated device for automatically rewinding the driving spring of the clockwork, means for connecting said device to a source of power actuated upon movement of the vehicle, the spring of the spring actuated device being balanced against the spring of the clockwork so that the spring actuated device rewinds the spring of the clockwork when the latter has run down a certain amount.

13. In a device of the character described, a clockwork, comprising a driving spring, a spring-actuated device for rewinding the spring of the clockwork, and a source of power connected to the spring actuated device, the two springs being balanced against each other so that the rewinding mechanism becomes operative when the clockwork spring has run down a certain amount.

14. In a device of the character described, a clockwork comprising a driving spring enclosed in a spring drum, mechanism for rewinding said driving spring comprising an element connected to said drum, a spring connected to said element and a source of power connected to said element for tensioning said last-mentioned spring.

15. In a device of the character described, a clockwork comprising a driving spring, a drum connected to the said spring and tending to drive it in one direction, and automatically operated rewinding mechanism for the driving spring, comprising an element engageable with said drum, a spring connected to said element tending to rewind said driving spring, and means, connected to a source of power, for periodically tensioning said spring.

16. A recording device for use on a vehicle, comprising a main shaft, means to drive said shaft in unison with the vehicle, a marker movable by the rotation of said shaft to produce a speed record, a disc to receive said record, means to rotate said disc including a spring under tension, means to maintain said spring under tension, said last named means being operable only when the tension has fallen below a predetermined value and means driven from said main shaft to produce a record of the distance traversed by said vehicle whether in a forward or a rearward direction.

In testimony whereof I affix my signature.

ANTHONY F. WALLBILLICH.